(12) United States Patent
Kim

(10) Patent No.: US 7,639,760 B2
(45) Date of Patent: Dec. 29, 2009

(54) APPARATUS, AND ASSOCIATED METHOD, FOR DETECTING DATA COMMUNICATED TO A RECEIVING STATION IN A MULTIPLE-CHANNEL COMMUNICATION SYSTEM

(75) Inventor: Kyeong Jin Kim, Irving, TX (US)

(73) Assignee: Nokia Corporation, Espoo (FI)

( * ) Notice: Subject to any disclaimer, the term of this patent is extended or adjusted under 35 U.S.C. 154(b) by 647 days.

(21) Appl. No.: 10/601,071

(22) Filed: Jun. 20, 2003

(65) Prior Publication Data

US 2005/0002359 A1 Jan. 6, 2005

(51) Int. Cl.
*H03D 1/00* (2006.01)
(52) U.S. Cl. .................. 375/341; 375/316; 375/347; 375/260; 375/262; 375/265; 370/334; 370/208; 370/206; 714/796; 714/790; 714/795
(58) Field of Classification Search .................. 375/267, 375/260, 316, 341, 347, 262, 265; 370/208, 370/334, 206; 714/796, 790, 795
See application file for complete search history.

(56) References Cited

U.S. PATENT DOCUMENTS

| | | | | |
|---|---|---|---|---|
| 6,385,753 | B1 * | 5/2002 | Hatakeyama | 714/796 |
| 2003/0124976 | A1 * | 7/2003 | Tamaki et al. | 455/15 |
| 2004/0028157 | A1 * | 2/2004 | Aoki et al. | 375/347 |
| 2004/0120411 | A1 * | 6/2004 | Walton et al. | 375/260 |
| 2004/0257978 | A1 * | 12/2004 | Shao et al. | 370/208 |

OTHER PUBLICATIONS

Kyeong Kim and Ronald Iltis, Joint Detection and Channel Estimation Algorithms for QS-CDMA Signals Over Time-Varying Channels, May 2002, IEEE, p. 845-855.*
Kyeong Jin Kim and Jiang Yue; Joint Channel Estimation and Data Detection Algorithms for MIMO-OFDM Systems, 2002.
Zheng Yuanjin; A novel Channel Estimation and Tracking Method for Wireless OFDM Systems Based on Pilots and Kalman Filtering, 2003.
Ki-Young Han, Sang-Wook Lee, Jun-Seok Lim, Member IEEE, and Koeng-Mo Sung, Member IEEE; Channel Estimation for OFDM with Fast Fading Channels by Modified Kalman Filter, 2004.

* cited by examiner

*Primary Examiner*—Chieh M Fan
*Assistant Examiner*—Eva Y Puente
(74) *Attorney, Agent, or Firm*—Alston & Bird LLP

(57) ABSTRACT

Apparatus, and an associated method, for recovering the informational content of data in an MIMO-OFDM communication system. Different data sets are communicated upon different subcarriers to a receiving station. Apparatus at the receiving station performs data value estimations based upon the communication conditions on the different subcarriers upon which the data is communicated. Separate path length estimations are performed upon the data communicated upon the different subcarriers, at complexity levels responsive to the communication conditions of the subcarriers.

20 Claims, 3 Drawing Sheets

APPARATUS, AND ASSOCIATED METHOD, FOR DETECTING DATA COMMUNICATED TO A RECEIVING STATION IN A MULTIPLE-CHANNEL COMMUNICATION SYSTEM

The present invention relates generally to a manner by which to recover the informational content of data communicated to a receiving station, such as a receiving station of a MIMO-OFDM (Multiple Input, Mulitiple Output—Orthogonal Frequency Division Multiplexing) communication system, upon a plurality of channels. More particularly, the present invention relates to apparatus, and an associated method, by which adaptively to detect, at the receiving station, the data values transmitted to the receiving station upon the plurality of channels.

Maximum-likelihood estimation, using QRD matrix operations, is used to detect the data. "M" values, i.e., metric calculator values, are derived for each of the channels upon which the data is communicated. M values are dependent upon the channel conditions of the channels. And, the values of M are determinative of the complexity of the maximum likelihood estimation calculations that are performed for each of the channels. When channel conditions are good, the complexity of the calculations is reduced. And, when channel conditions are poor, the complexity of the calculations is increased.

BACKGROUND OF THE INVENTION

Communication of information is an endemic need of modern society. A communication system is used through which to communicate the information. A communication system includes, at a minimum, a set of communication stations including a sending station and a receiving station. The communication stations are interconnected by way of a communication channel. If necessary, the sending station first converts the information into a form to permit its communication upon the communication channel. And, correspondingly, at the receiving station, the receiving station converts the received information into a form to facilitate the recovery of its informational content.

Many different types of communication systems have been developed and implemented to communicate data pursuant to many different types of communication services. As technological advancements permit, improvements to existing communication systems, and implementation of new types of communication systems, shall likely be possible.

A radio communication system is an exemplary type of communication system. A radio communication system is a type of communication system in which communication channels are defined upon radio links extending between the communication stations thereof. Radio communication systems provide several advantages over their wireline counterparts. The infrastructure costs associated with initial implementation and deployment of a radio communication system are generally lower than the corresponding costs associated with implementation and deployment of a wireline counterpart. And, a radio communication system is amenable for implementation as a mobile communication system. Because radio links, rather than wireline connections, are used to interconnect the communication stations, the communication stations need not be positioned at a fixed location.

A cellular communication system is a type of radio communication system that has achieved significant levels of popular usage. The network infrastructures of cellular communication systems have been installed throughout significant portions of populated areas of the world. The cellular communication systems are constructed, generally, pursuant to selected operating standards promulgated by standard-setting bodies. Such operating standards set forth, amongst other things, the operational parameters of the elements of the communication systems and the signaling generated during their operation.

The network infrastructure of a cellular communication system includes base transceiver stations that are positioned at selected locations throughout a geographical area to be encompassed by the communication system. Each base transceiver station defines an area, referred to as a cell, and a cellular communication system derives its name from such a designation.

Telephonic communications are effectuated between the base transceiver stations and mobile stations. Mobile stations are portable transceivers capable of detecting and transmitting signals upon the radio channels defined in the cellular communication systems. Access by a mobile station to communicate with the network infrastructure is generally granted pursuant to a service subscription. Users of mobile stations are, accordingly, sometimes referred to as subscribers, and the mobile stations are sometimes referred to as subscriber stations.

In an ideal communication system, the values of information, i.e., data, received at a receiving station are identical to corresponding values transmitted by a sending station. That is to say, the communication channel is distortion-free and does not distort the values of the data when communicated thereon. But, in an actual communication system, the data, operated upon at a receiving station, might well differ in value with the corresponding values when sent by a sending station. If the distortion is significant, the informational content of the data cannot be recovered at the receiving station.

Fading conditions upon the communication channel is a source of distortion of the data communicated upon the communication channel. If the level of fading is significant, the informational content of the data might not be able to be recovered.

The distortion caused by fading is compensated for by various techniques. Space diversity, for instance, is sometimes utilized. Space diversity is created at a sending station through the use of more than one transmit antenna from which data is converted into electromagnetic form and sent upon separate communication paths to a receiving station. Spatial redundancy is provided through the use of multiple transmit antennas. The separation distances separating the transmit antennas are selected in manners better to ensure that the signals transmitted from the respective transmit antennas fade in uncorrelated manners. Receiving stations also sometimes are formed to include multiple receive antennas, also typically separated by selected separation distances.

Radio communication systems that utilize multiple antenna configurations at the sending and receiving stations are sometimes referred to as MIMO (Multiple Input, Multiple Output) systems. Communications in an MIMO system permit higher overall communication capacities relative to conventional systems that utilize only single-antenna configurations.

OFDM (Orthogonal Frequency Division Multiplexing) communication techniques are amenable for use in an MIMO communication system. OFDM communication techniques facilitate mitigation of the effects of frequency selective fading. In such a technique, a set of frequency subcarriers are formed in which each of the subcarriers exhibits flat fading conditions. An MIMO-OFDM system, i.e., an MIMO communication system that utilizes OFDM communication techniques, is able to achieve high data rates as separate data, communicated upon separate subcarriers, is communicated concurrently by a sending station to a receiving station.

Channel conditions upon the separate subcarriers are uncorrelated, and different ones of the subcarriers exhibit different fading conditions. And, the recovery of the informational content of the data sent upon different ones of the subcarriers is achieved with different levels of effort. The overall performance of an MIMO-OFDM system, however, is dominated by the communication performance data communicated upon the weaker subcarriers. Operations at the receiving station to recover the informational content of the data, in a common manner, oftentimes is an inefficient manner by which to recover the informational content of the data.

If a manner could be provided by which to take into account the communication conditions upon the individual subcarriers, or channels otherwise defined, improved efficiency of receiving station operation would be provided.

It is in light of this background information related to communications in an MIMO communication system that the significant improvements of the present invention have evolved.

SUMMARY OF THE INVENTION

The present invention, accordingly, advantageously provides apparatus, and an associated method, by which to recover the informational content of data communicated to a receiving station, such as a receiving station of an MIMO-OFDM communication system, upon a plurality of channels.

Through operation of an embodiment of the present invention, a manner is provided by which adaptively to detect, based upon data values received at the receiving station, the values transmitted to the receiving station upon the plurality of channels.

Maximum-likelihood estimations are performed upon the data received upon each of the channels to form maximum likelihood paths. QRD matrix operations are performed by which to estimate the maximum likelihood paths. "M" values, i.e., metric calculator values, are derived and used in conjunction with the QRD matrix operations. A separate M is derived for each of the channels upon which data is communicated.

The M values, when used in conjunction with the QRD matrix operations, are determinative of the complexity of the maximum likelihood estimation calculations that are performed for each of the channels. When channel conditions on a subcarrier are good, the complexity of the calculations to obtain a maximum-likelihood estimation is reduced. And, when channel conditions are poor, the complexity of the calculations to obtain the maximum-likelihood estimation is increased. A balance is obtained, thereby, between computational complexity and estimation speed.

Data detection is performed upon data communicated upon each of the subcarriers to a receiving station. A successive interference canceller is considered, such as QRD-M, BLAST, a subset of the QRD-M, and a decision feedback-based detector. Improved performance is selectably obtained as the number of a temporary memory for an accumulated distance metric that is determined by the value of M for the QRD-M. In an OFDM system, the communication performance is dominated by the weaker subcarriers, i.e., the subcarriers that exhibit poor communication conditions. To improve performance, more powerful detectors are used to operate upon data communicated upon the weaker subcarriers. Depending upon the power strength of a subcarrier, the value M is adaptively assigned. A different detector is used for each subcarrier, and the complexities of detection operations performed upon the data detected upon the different ones of the subcarriers is dependent upon the communication conditions thereon and the corresponding values of M that are assigned responsive thereto.

Additionally, the power strengths and decision thresholds are estimated, thereby to permit assignation of different detectors over independent multipath channels. An optimal decision threshold is determined using the estimated distributions. Improved performance is provided while reducing overall complexity of detection operations.

Because the values of M are adaptively determined, as communication conditions change on different ones of the subcarriers, the complexities of the detection operations performed upon the data received upon the separate subcarriers are correspondingly changed. If channel conditions improve, for instance, the complexities by which the data is operated upon is reduced. Conversely, when the communication conditions worsen, the complexities of detection operations are increased.

The values of M are associated with communication quality levels of communications upon communication channels upon which data is communicated to a receiving station. The communication conditions upon the subcarriers upon which the communication channels are defined are determined, such as pursuant to examination of a signal strength level. Values of M are maintained at a look-up table, the contents of which are accessible based upon the measured, or otherwise determined, communication conditions. The values of M are used in the detection of the values of the data received on the individual ones of the subcarriers. The value of M is determinative of the proportion of the possible paths of a maximum length estimation procedure that is carried out. When communication conditions are good, fewer possible path lengths need to be estimated. Conversely, when communication conditions are poor, increased numbers of path lengths are estimated to estimate a minimum path-length.

In these and other aspects, therefore, apparatus, and an associated method, is provided for a multiple-input, multiple-output communication system. Transmit data is communicated to a receiving station upon a plurality of channels and received as receive data thereat. Detection at the receiving station of the transmit data is facilitated responsive to values of the receive data received at the receiving station. A selector is selectably operable to select a metric calculator value (M) for each of a selected number of the plurality of channels. A decoder is adapted to receive each metric calculator value selected by the selector and to the values of data, once received at the receiving station. The decoder separately decodes the values of the received data received at the receiving station upon each of the at least the selected number of the plurality of channels. The decoding is performed separately for the receive data received upon separate ones of the selected number of the channels at complexity levels responsive to respective metric calculator values selected by the selector.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
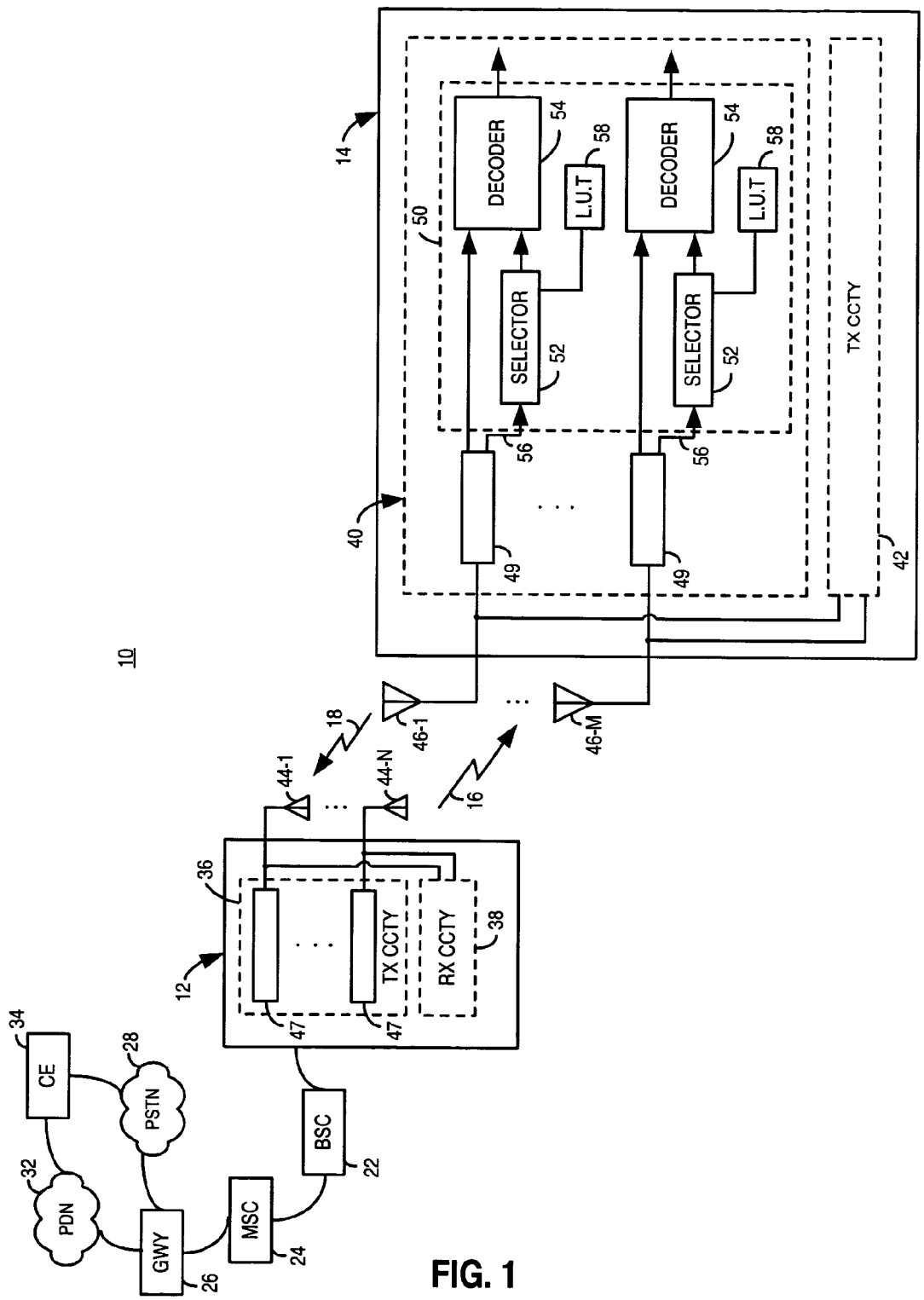
FIG. 1 illustrates a functional block diagram of a multiple-input, multiple-output communication system in which an embodiment of the present invention is operable.

Referring first to FIG. 1, a radio communication system, shown generally at 10, provides for communications between communication stations. The communication stations are interconnected by way of radio channels defined upon radio links formed to extend between the communication stations of the communication system. In the exemplary implementation, two-way communications are effectuable. Here, two radio transceivers of the communication system are illustrated. A first of the radio transceivers forms a base transceiver station (BTS) 12. And, a second a second radio transceiver forms a mobile station. The radio communication system 10 here forms a cellular communication system of which the BTS 12 and the mobile station 14 are each representative of a plurality of such devices in a typical cellular communication system. And, more generally, the base transceiver station and mobile station shown in the Figure are representative of communication stations that send, and receive, data by way of radio communication channels.

Data communicated by the base transceiver station to the mobile station is communicated upon downlink channels defined upon a radio downlink formed between the base transceiver station and the mobile station. And, data communicated by the mobile station to the base transceiver station is communicated upon uplink channels defined upon a radio uplink formed between the mobile station and the base transceiver station. The radio downlink, and downlink channels defined thereon is represented by the arrow 16. And, the radio uplink, and uplink channels defined thereon, is represented by the arrow 18.

The cellular communication system forming the radio communication system in the exemplary implementation shown in FIG. 1 is constructed pursuant to a selected cellular communication standard. That is to say, the various elements of which the communication system is formed include elements that are constructed to conform with the parameters defining operation of such elements as set forth in an operating specification associated with the selected cellular communication system. An exemplary cellular communication standard is a 3G, CDMA (Third Generation, Code-Division, Multiple-Access) communication system that utilizes a CDMA communication scheme. Another exemplary cellular communication standard is a GSM (Global System for Mobile communications) system that utilizes a TDMA (Time-Division, Multiple-Access) communication scheme. Operation of an embodiment of the present invention is implementable in a cellular communication system operable pursuant to either of these communication standards, as well as others. And, more generally, an embodiment of the present invention is implementable in any of many other varied types of communication systems, radio and otherwise, that transmit data upon a plurality of channels concurrently.

The base transceiver station forms part of a radio access network that is operable pursuant to the selected cellular communication standard. The radio access network also includes a base station controller (BSC) 22. The base station controller, in turn, is coupled to a mobile switching center (MSC) 24 and to a gateway (GWY) 26. The mobile switching center and gateway also form portions of the radio access network.

The mobile switching center is coupled to a network, here a public-switched telephonic network (PSTN) 28. And, the gateway 26 is coupled to a network 32, here a packet data network (PDN), such as the Internet. A communication device, here identified as a correspondent entity (CE) 34 is coupled to both the packet data network and to the PSTN. The correspondent entity is representative of a data source or a data destination from which, or to which, information is routed during operation of the communication system.

The base transceiver station 12 includes radio transceiver circuitry, here represented by a receive part, formed of receive circuitry 36 and a transmit part, formed of transmit circuitry 38. Data to be communicated by the base transceiver station upon a downlink channel to the mobile station is converted into a form to permit its communication upon downlink channels 16 by the transmit circuitry 38. And, data communicated by the mobile station to the base transceiver station upon uplink channels 18 are detected, and operated upon, by the receive circuitry 36.

The mobile station, also forming a radio transceiver, includes analogous radio transceiver portions, here represented by receive circuitry 40 and transmit circuitry 42. The receive circuitry 40 operates to detect the data transmitted by the base transceiver station upon the downlink channels thereto. And, the transmit circuitry operates to transmit the uplink data that is to be sent upon the uplink channels to the base transceiver station.

Both the base transceiver station 12 and the mobile station 14 include multiple antenna transducers. The base transceiver station-mobile station combination defines a multiple-input, multiple-output (MIMO) communication system. N spaced-apart antennas are positioned at the base transceiver station, shown 44-1 through 44-N. And, the mobile station includes M antenna transducers, shown at 46-1 through 46-M. The antenna transducers 44 and 46 of the respective elements 12 and 14 are each coupled to both the respective receive and transmit circuitries thereof. That is to say, the antennas 44 are coupled to both the receive and transmit circuitries 36 and 38 of the base transceiver station. And, the antennas 46 are coupled to both the receive and transmit circuitries 40 and 42.

An MIMO system is amenable for implementation as an OFDM (Orthogonal Frequency Division Multiplexing) communication scheme. Pursuant to such a scheme, the communication throughput of data communicated between the base transceiver station and the mobile station, for instance, can be increased as separate data can be communicated therebetween upon different subcarriers. That is to say, parallel communication of data between communication stations is effectuable upon different subcarriers defined pursuant to the OFDM communication scheme.

The transmitter circuitry 38 of the base transceiver station 12, for instance, is formed of N transmitting sub-circuits 47. Separate data, applied to, or originated at, the separate transmitting sub-circuits 47 is applied to separate ones of the antennas 44. The sub-circuits are operable concurrent to one another such that the data applied to separate ones of the antennas 44 are communicated therefrom concurrently.

The receive circuitry 40 of the mobile station is also shown to be formed of a plurality of receive sub-circuits 49. Separate sub-circuits are coupled to separate ones of the receive antennas 46 and are separately operable to operate upon data received at the separate ones of the antennas 46. Through appropriate selection of the characteristics of the different receive sub-circuits, different ones of the receive sub-circuits operate upon data communicated upon different subcarriers. Thereby, different receive sub-circuits operate upon different data sets.

Because the subcarriers exhibit different communication conditions, such as different fading conditions, distortion introduced upon the data, communicated upon the different ones of the subcarriers correspondingly is dissimilar. Data communicated upon downlink radio channels defined upon some subcarriers therefore include greater amounts of distortion than data communicated upon radio downlink channels defined upon others of the subcarriers.

Operating upon the received data in common manner is unable appropriately to operate upon data communicated upon certain of the subcarriers. That is to say, excessively complex computations are performed upon the data to recover the informational content thereof if communication conditions are good and a computationally-complex scheme is used to recover the informational content of the data. And, conversely, if communication conditions are poor, and a simplified recovery scheme is utilized by which to recover the informational content of the data, the informational content of the data cannot be properly recovered.

The mobile station also includes apparatus 50 of an embodiment of the present invention. The receive circuitry of the base transceiver station also, in the exemplary implementation, includes analogous such apparatus 50. The apparatus facilitates recovery of the data received at the receive circuitry 44 upon the separate subcarriers.

The apparatus 50 includes a selector 52 and a decoder 54. The decoder includes decoder elements 54-1 through 54-M that operate upon the data received by separate ones of the receive sub-circuits of the receive circuitry. Each of the decoder elements functions as a path-length estimator for estimating minimum path lengths pursuant to a path estimation scheme. The selector 52 selects, separately for each decoder sub-element, a value of M that is used by the decoder sub-element to which the value is applied to define the complexity by which the path length estimation is performed. The selector is coupled, here indicated by way of the line 56, to receive indications of the communication conditions upon the subcarrier upon which the data is communicated to the mobile station. Responsive to such indications, the selector selects the values of M and provides such values to the decoder sub-elements of the decoder.

In the exemplary implementation, values of M are stored at a look-up table 58. And, the selector selects the values of M by accessing storage locations of the look-up table responsive to values of the channel conditions delivered on the line 56 to the selector. Retrieved values, retrieved from the look-up table are applied to the decoder and used thereat to perform decoding operations, i.e., minimum path length estimations, on the data symbols of the data operated upon the various receive paths of the receive circuitry.

QRD matrix operations are performed upon the data applied to the separate decode sub-elements. The proportion of the possible paths of which path lengths are estimated is a function of M. That is to say, when M is a large value, increased numbers of the possible path lengths are calculated upon which to estimate the minimum path. And, when the value of M is small, a reduced number of path lengths of the possible paths are estimated by which to obtain the minimum path length estimation.

In the exemplary implementation, each OFDM transmitter, here the transmit circuitry of the base transceiver station, consists of K equally-spaced, orthogonal subcarriers. Each of the subcarriers is modulated with an input symbol sequence. The modulated signals carry the information for all of the subcarriers. To form a robust OFDM system to combat fading, an acceptable guard time interval $T_G$ is also utilized. The OFDM signal is transmitted upon the downlink radio channels to the mobile station.

The radio channel between the pth the qth receive antenna is modeled by a path delay line (TDL) with taps $F_1^{p,q}(n)$ forming elements of C, $T_s$ seconds apart. The receive signal at the q-th receive antenna is represented as:

$$r^q(t) = \sum_{p=1}^{N_t} \sum_{l=0}^{N_f-1} f_l^{p,q}(n) s^p(t - lT_s) + n^q(t),$$

where $N_f$ is the number of multi-paths, and $s^p(t)$ is the output of the p-th modulator. Additive noise, $q^q(t)$ form circular white Gaussian noise. The multi-path spread is assumed to $N_f T_s$ is less than or equal $T_g$ with a guard time interval $T_g$. The receiver is assumed to be matched to the transmitted pulse, eliminating the guard interval, and the sampled receive signal inputs to the demodulator. The demodulator output is given by:

$$y_k(n) = \begin{bmatrix} F_k^{1,1}(n) & F_k^{2,1}(n) & \cdots & F_k^{N_t,1}(n) \\ F_k^{1,2}(n) & F_k^{2,2}(n) & \cdots & F_k^{N_t,2}(n) \\ \vdots & & & \vdots \\ F_k^{1,N_r(n)}(n) & F_k^{2,N_r}(n) & \cdots & F_k^{N_t,N_r}(n) \end{bmatrix} \begin{bmatrix} d_k^1(n) \\ d_k^2(n) \\ \vdots \\ d_k^{N_t}(n) \end{bmatrix} + \begin{bmatrix} z_k^1(n) \\ z_k^2(n) \\ \vdots \\ z_k^{N_t}(n) \end{bmatrix},$$

$$= F_k(n) d_k(n) + z_k(n).$$

$F_k(n)$ represents the frequency response of all of the M times N channels at FFT frequency k. Also, $y_k^q(n)$ is the receive signal over the k-th subcarrier through the q-th receive antenna. With an available channel estimate, the maximum likelihood data detection for the k-th subcarrier is:

$$\hat{d}_k(n)_{ML} = \arg \min_{d_k(n) \in |S|^{N_t}} \left\| y_k(n) - \hat{F}_k(n) d_k(n) \right\|^2.$$

From this equation, the computational complexity grows exponentially with the number of transmit antennas and the cardinality of the subcarrier modulation. Pursuant to operation of an embodiment of the present invention, interference cancellers, such QRD-M, decision feedback based detectors can be applied.

For the QRD-M detector, the QRD decomposition is first applied to the channel matrix such that:

$$\hat{d}_k(n)_{ML} = \arg \min_{d_k(n) \in |S|^{N_t}} \left\| Q_k^H(n) y_k(n) - Q_k^H(n) \hat{F}_k(n) d_k(n) \right\|^2$$

$$= \arg \min_{d_k(n) \in |S|^{N_t}} \left\| \tilde{y}_k(n) - R_k^H(n) d_k(n) \right\|^2,$$

where $y_k(n)$ equals $R_k(n)$. To assign a different detector, based upon the QRD-M algorithm, a suitable decision device is used, based upon the property of the upper triangular matrix $R_k(n)$. The power of a diagonal component of the matrix is denoted by $\|R_k(n)_{pp}\|^2$, where $p=1, \ldots N_t$ and is bounded by the power of the frequency channel response. If each multipath is modeled as a complex Gaussian with a different power, and the IID channels, then the probability distribution of such diagonal is upper-bounded by an exponential distribution that is mainly determined by the multipath power strength.

Analogously, the distribution of:

$$\|(R_k(n))_{p,p}\|^2, \, p = 1, \ldots, N_t \text{ and } P_k \equiv \sum_{p=1}^{N_t} \|(R_k(n))_{p,p}\|^2.$$

is upper-bounded Erlang distribution. Such densities can also be estimated using a kernal density. Using the upper bounded distributions or the estimated distributions, a look-up table, here the table 58 is created at which the values of M are stored. As the distribution is the function of the power for each subcarrier, and the detector performance depends upon the value of M, a small value of M is assigned for a strong subcarrier. But, a large of M is assigned for a weak subcarrier to form, as a result, a better detector. Although a different detector can be assigned for a different subcarrier depending upon its power strength, finding a decision threshold, and its corresponding value of M is still problematical. Most simply, the power range is divided for all subcarriers uniformly. Or, in the exemplary implementation, a Lloyd-Max quantization method is used where decision levels are functions of an actual unknown distribution. Through substitution of the actual unknown distribution with the estimated one, its optimization procedures are used. By using such an optimization method, the performance is improved, compared with a uniform quantization method.

Figure 2:
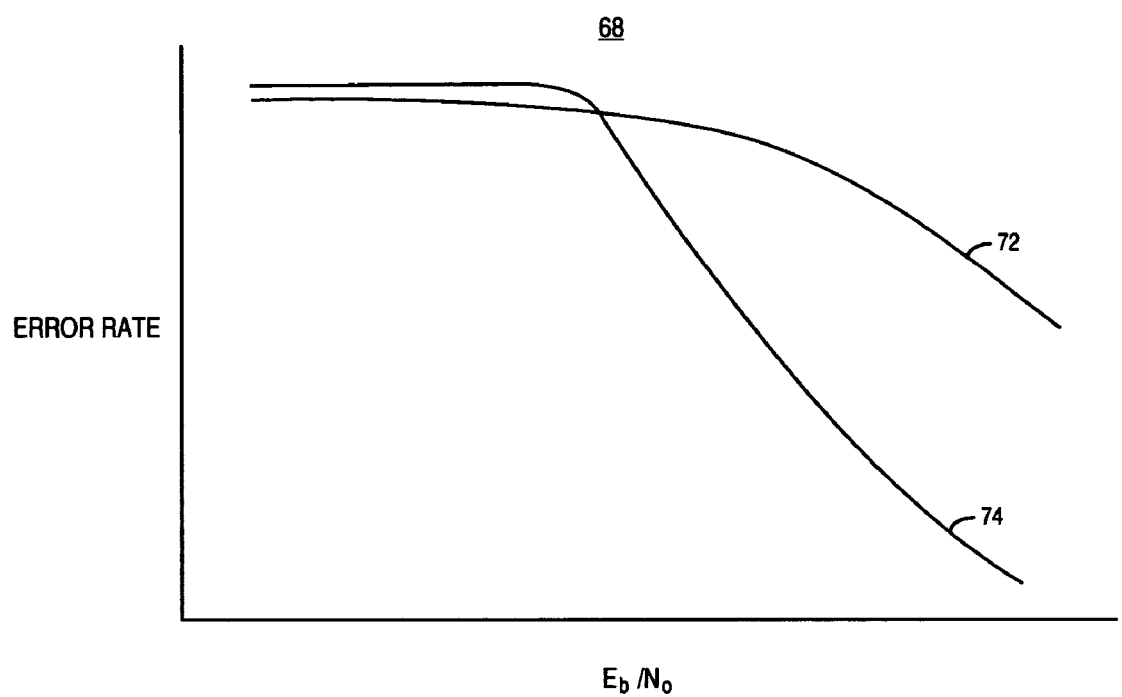
FIG. 2 illustrates a graphical representation showing the effects of operation of an embodiment of the present invention by which to facilitate recovery of data communicated during operation of the communication system shown in FIG. 1.

FIG. 2 illustrates a graphical representation, shown generally at 68, in which plots of the bit error rates of the received data subsequent to operation thereupon by receive circuitry. The plot 72 is representative of the bit error rates when conventional error recovery methods are utilized. And, the plot 74 is representative of the bit error rates when operation of an embodiment of the present is utilized. Improved communication performance is shown to be provided.

Figure 3:
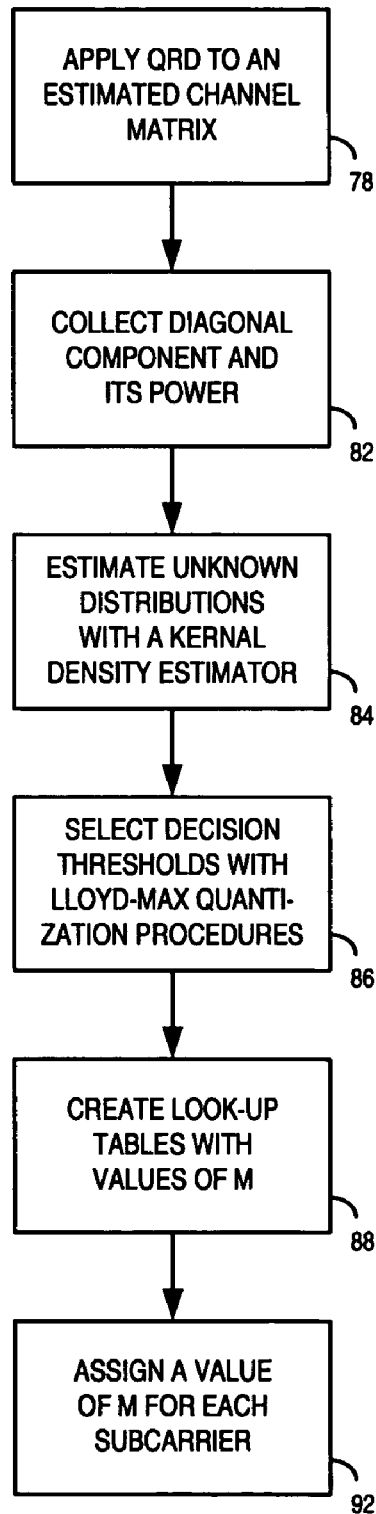
FIG. 3 illustrates a method flow diagram listing the method of operation of an embodiment of the present invention.

FIG. 3 illustrates a method flow diagram, shown generally at 76, that lists the method of operation of an embodiment of the present invention. The method facilitates recovery of the informational content of the data in an MIMO-OFDM communication system. First, and as indicated by the block 78, the QRD is applied to an estimated channel matrix. Then, and as indicated by the block 82, the diagonal component, and its power, are collected. Then, and as indicated by the block 84, a kernel density estimator is applied to estimate unknown distributions. Then, and as indicated by the block 86, Lloyd-Max quantization procedures are applied to select decision thresholds. And, as indicated by the block 88, a look-up table is generated and, as indicated by the block 92, for each subcarrier, depending upon its power strength, a different value of M for the detector is assigned.

Thereby, through operation of an embodiment of the present invention, a manner is provided by which to recover data communicated upon a plurality of subcarriers, or other communication channels that exhibit differing communication conditions.

The previous descriptions are of preferred examples for implementing the invention, and the scope of the invention should not necessarily be limited by this description. The scope of the present invention is defined by the following claims.

I claim:

1. An apparatus comprising:
a selector configured to select metric calculator values for respective ones of a plurality of channels in a Multiple-Input, Multiple-Output communication system in which transmit data is communicated to a receiving station upon the plurality of channels and received as receive data thereat, the metric calculator values selected for at least two of the channels differing from one another; and
a decoder configured to separately decode values of the receive data received upon separate ones of the channels, wherein, for the values of the receive data received upon each of the channels, the decoder being configured to decode the values of the receive data includes being configured to perform a path length estimation for the respective channel, including being configured to calculate a path length for each of a number of possible paths upon which to estimate a minimum path length, the number of possible paths being selected based on the metric calculator value selected for the respective channel.

2. The apparatus of claim 1, wherein the decoder is configured to perform a separate path-length estimation for each of the channels.

3. The apparatus of claim 2, wherein the decoder is configured to calculate a path length for each of a number of possible paths defined by possible values of the transmit data.

4. The apparatus of claim 2, wherein the decoder being configured to perform a path length estimation includes being configured to estimate a maximum likelihood path.

5. The apparatus of claim 4, wherein the decoder being configured to estimate a maximum likelihood path includes being configured to estimate a maximum likelihood path using a QRD (QR Decomposition) technique upon the selected number of possible paths.

6. The apparatus of claim 1, wherein the selector is configured to select the metric calculator values based on communication conditions upon the respective channels.

7. The apparatus of claim 6, wherein the selector is configured to receive indications of the communication conditions upon the respective channels, the selector being configured to select the metric calculator values based on the indications.

8. The apparatus of claim 6, wherein selected number of possible paths is inversely related to the communication conditions such that the number of possible paths increases when the communication conditions worsen.

9. The apparatus of claim 1, wherein the communication system operates pursuant to an OFDM (Orthogonal Frequency Division Multiplexing) scheme in which channels are defined upon channel subcarriers, and wherein the metric calculator values selected by the selector are representative of communication conditions upon respective channel subcarriers.

10. The apparatus of claim 9, wherein the metric calculator values are maintained at a storage table, and wherein the selector is configured to select metric calculator values from the values maintained at the storage table.

11. The apparatus of claim 9, wherein the selector is configured to dynamically select the metric calculator values.

12. A method comprising:
selecting metric calculator values for respective ones of a plurality of channels in a Multiple-Input, Multiple-Output communication system in which transmit data is communicated to a receiving station upon the plurality of channels and received as receive data thereat, the metric calculator values selected for at least two of the channels differing from one another; and separately decoding values of the receive data received upon separate ones of the channels, wherein, for the values of the receive data received upon each of the channels, decoding the values of the receive data includes performing a path length estimation for the respective channel, including calculating a path length for each of a number of possible paths upon which to estimate a minimum path length, the number of possible paths being selected based on the metric calculator value selected for the respective channel.

13. The method of claim 12, wherein selecting the metric calculator values comprises selecting the metric calculator values based on communication conditions upon the respective channels.

14. The method of claim 12 wherein performing a path length estimation comprises performing a maximum-likelihood path estimation, including calculating a path length for each of a number of possible paths defined by possible values of the transmit data.

15. The method of claim 12, wherein selecting the metric calculator values comprises selecting the metric calculator values based on communication conditions upon the respective channels.

16. The method of claim 12, wherein the communication system operates pursuant to an OFDM (Orthogonal Frequency Division Multiplexing) scheme in which channels are defined upon channel subcarriers, and wherein selecting the metric calculator values comprises selecting the metric calculator values representative of communication conditions upon respective channel subcarriers.

17. An apparatus comprising:

circuitry configured to select metric calculator values for respective ones of a plurality of channels in a Multiple-Input, Multiple-Output communication system in which transmit data is communicated to a receiving station upon the plurality of channels and received as receive data thereat, the metric calculator values selected for at least two of the channels differing from one another, wherein the circuitry is also configured to separately decode values of the receive data received upon separate ones of the channels, and wherein, for the values of the receive data received upon each of the channels, the circuitry being configured to decode the values of the receive data includes being configured to perform a path length estimation for the respective channel, including being configured to calculate a path length for each of a number of possible paths upon which to estimate a minimum path length, the number of possible paths being selected based on the metric calculator value selected for the respective channel.

18. The apparatus of claim 17, wherein the circuitry being configured to perform a path length estimation includes being configured to estimate a maximum likelihood path.

19. The apparatus of claim 18, wherein the circuitry being configured to estimate a maximum likelihood path includes being configured to estimate a maximum likelihood path using a QRD (QR Decomposition) technique upon the selected number of possible paths.

20. The apparatus of claim 17, wherein the circuitry is configured to select the metric calculator values based on communication conditions upon the respective channels.

* * * * *

UNITED STATES PATENT AND TRADEMARK OFFICE
CERTIFICATE OF CORRECTION

PATENT NO. : 7,639,760 B2  Page 1 of 1
APPLICATION NO. : 10/601071
DATED : December 29, 2009
INVENTOR(S) : Kyeong Jin Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,639,760 B2 | |
| APPLICATION NO. | : 10/601071 | |
| DATED | : December 29, 2009 | |
| INVENTOR(S) | : Kim | |

It is certified that error appears in the above-identified patent and that said Letters Patent is hereby corrected as shown below:

Column 10,
Line 44, "wherein selected" should read --wherein the selected--.

Signed and Sealed this
Twenty-eighth Day of June, 2011

David J. Kappos
*Director of the United States Patent and Trademark Office*